United States Patent [19]

Ver Nooy et al.

[11] 3,940,855

[45] Mar. 2, 1976

[54] PIPELINE PIG

[75] Inventors: Burton Ver Nooy; Larry D. Payne; Robert L. Kendall, all of Tulsa, Okla.

[73] Assignee: T. D. Williamson, Inc., Tulsa, Okla.

[22] Filed: July 19, 1974

[21] Appl. No.: 490,201

[52] U.S. Cl. ............. 33/174 L; 33/178 E; 33/178 F
[51] Int. Cl.$^2$ .. E21B 47/08; G01B 5/12; G01B 7/12
[58] Field of Search .......... 33/174 L, 174 P, 178 E, 33/178 F

[56] References Cited
UNITED STATES PATENTS

| | | | |
|---|---|---|---|
| 2,030,244 | 2/1936 | Cox .................................... | 33/178 F |
| 2,567,548 | 9/1951 | Chaney et al. ..................... | 33/178 F |
| 2,810,203 | 10/1957 | Bachofer ............................ | 33/178 F |
| 3,685,158 | 8/1972 | Planche .............................. | 33/178 F |

*Primary Examiner*—Richard E. Aegerter
*Assistant Examiner*—Richard R. Stearne
*Attorney, Agent, or Firm*—Marvin B. Eickenroht; W. F. Hyer

[57] ABSTRACT

A pipeline pig is provided which is especially adapted for use in conjunction with laying offshore pipelines in that it detects and indicates dents, and other disconformities in the nominal cross-sectional configuration of the pipeline which may occur as a result of the laying of the pipeline. It employs a plurality of prolate spheroid rollers arranged to secure substantially full circle coverage of the pipeline and yet only a minor portion of the length of the rollers will be normally in contact with the pipeline thereby reducing the wear on the remaining portions of the rollers and increasing the ease with which the pig can be towed along the pipeline. In another aspect, a system is provided in which a pig includes with a means of sensing a condition along the pipeline and a memory means for storing the output of the detecting means. The system also includes a readout means located remotely from the pig and transmission means connecting the memory means to the readout means for periodically reading out the output stored in the memory means within the pig while the latter is within the pipeline.

10 Claims, 10 Drawing Figures

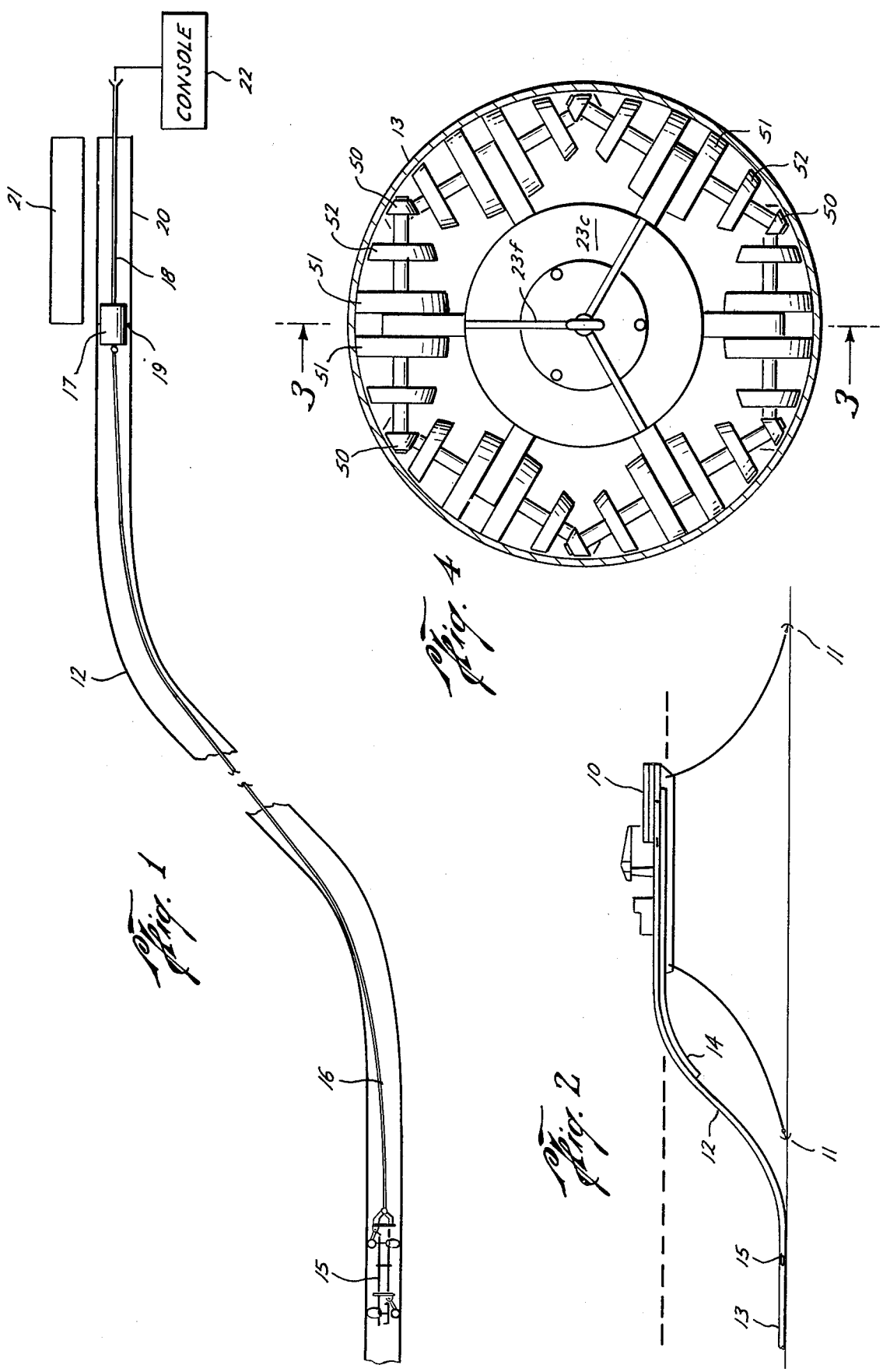

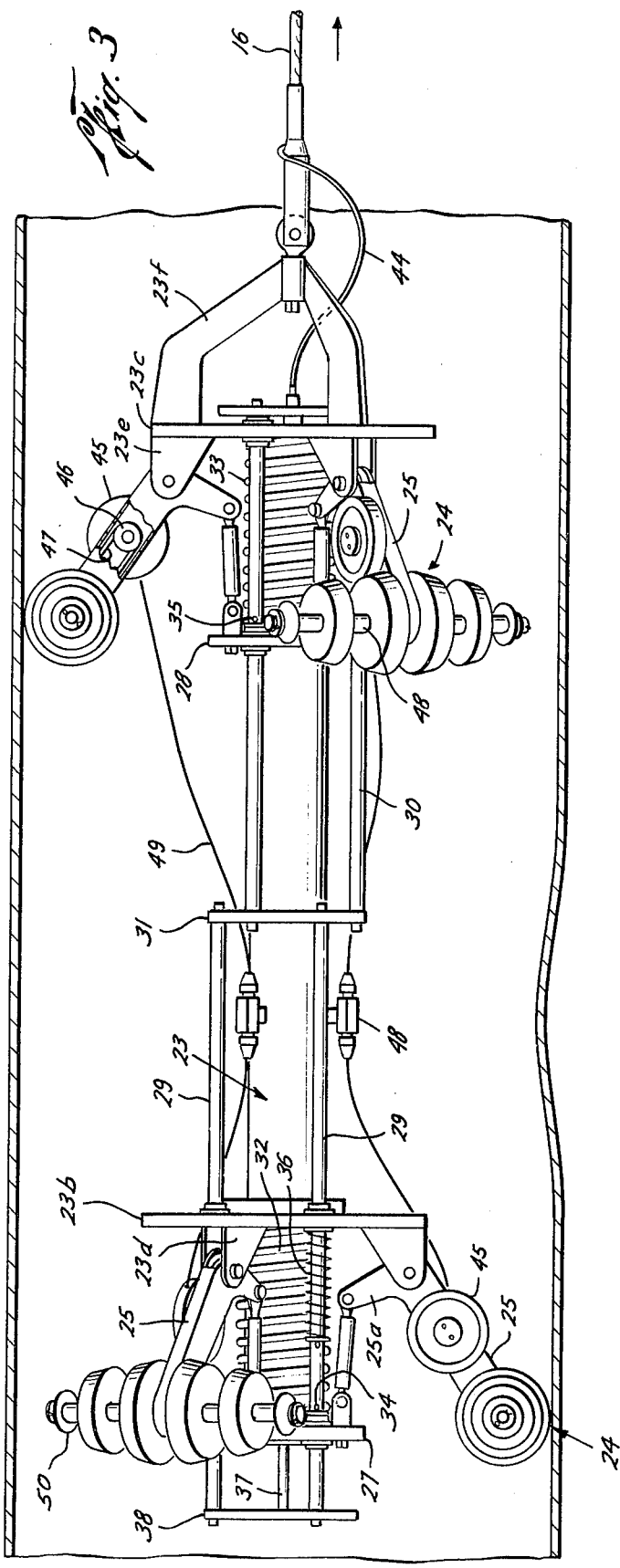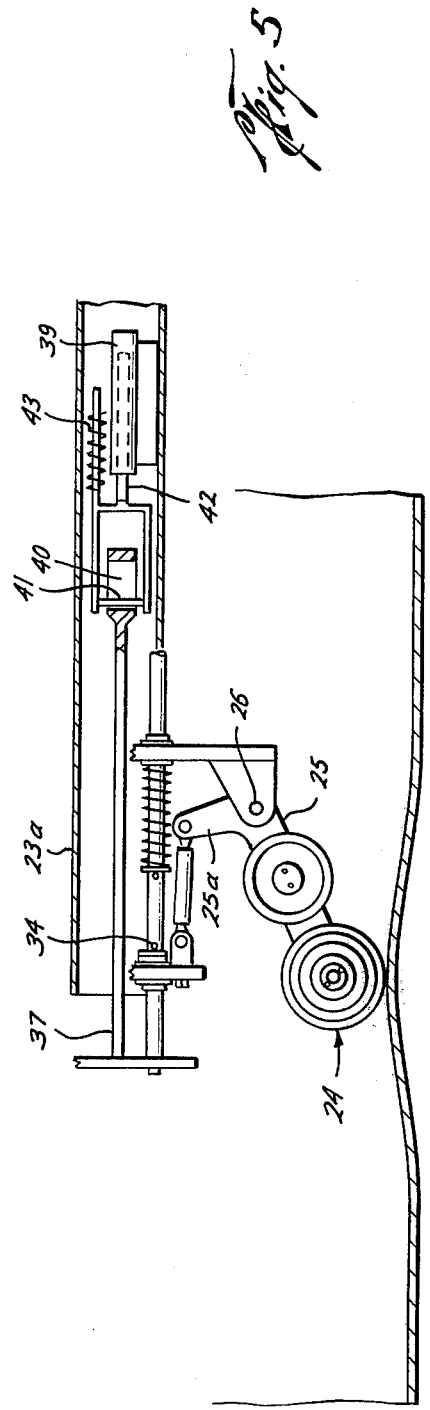

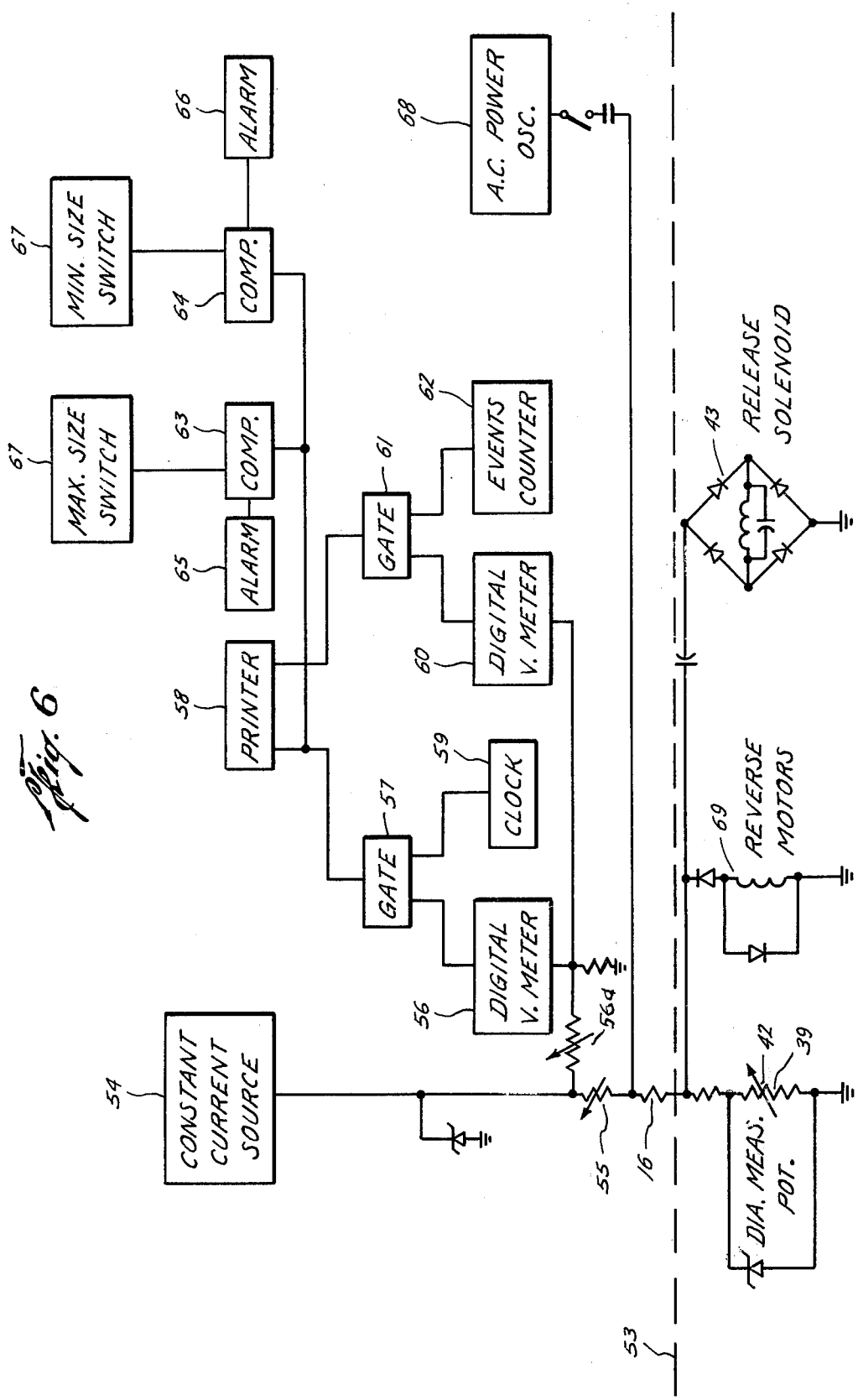

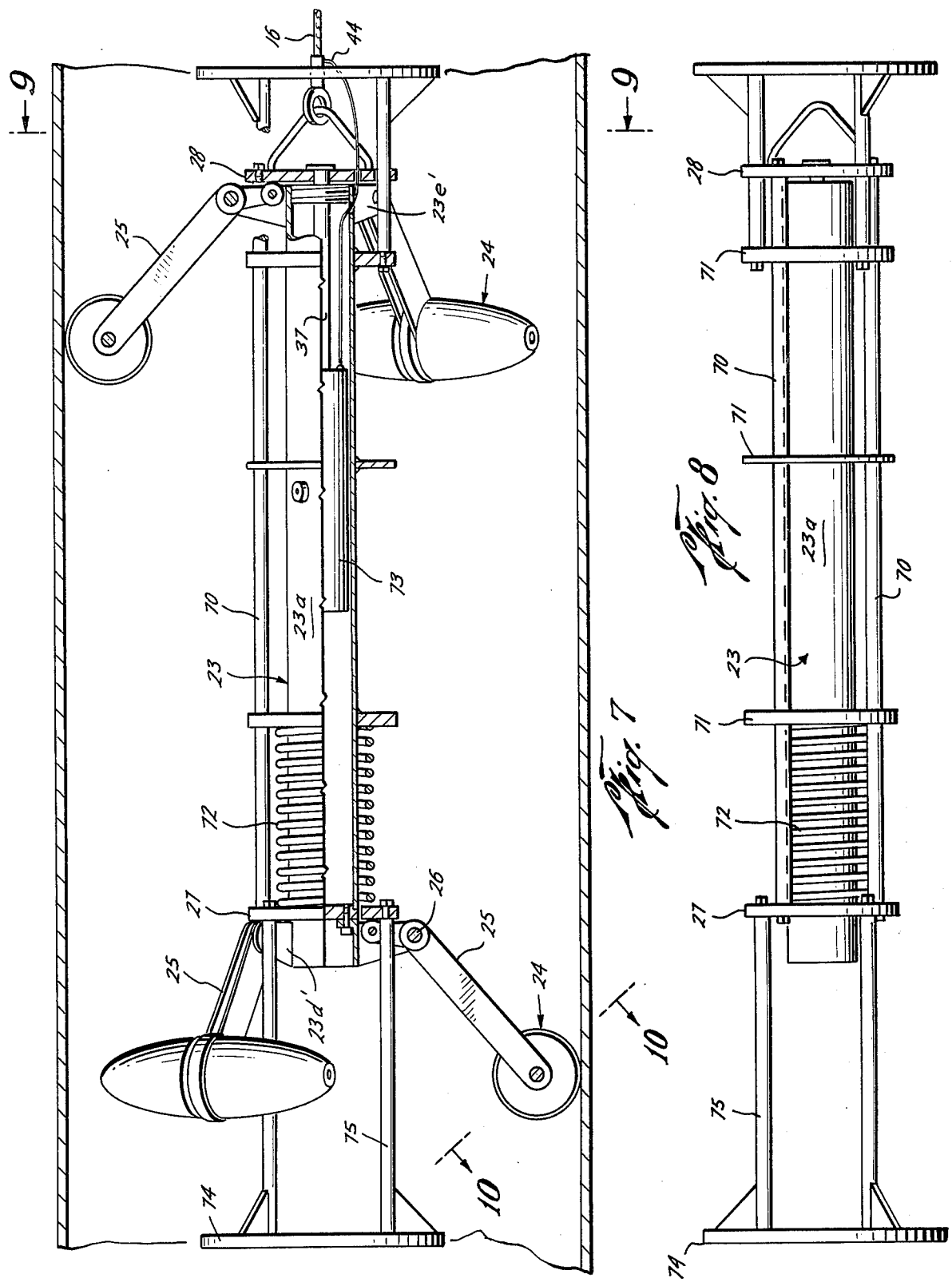

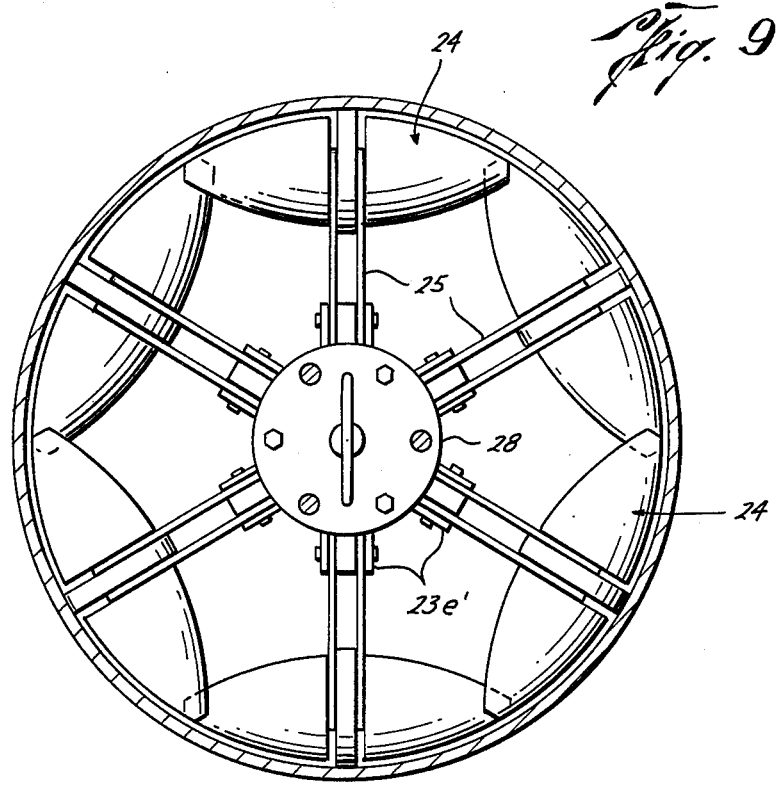
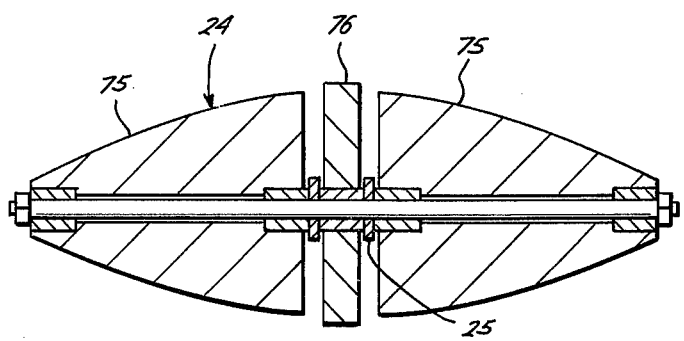

PIPELINE PIG

This invention relates to a pipeline pig which is especially adapted to be towed through an offshore pipeline as the same is being laid in order to determine objectionable disconformities in the nominal cross-sectional configuration of the pipeline caused by the laying operations. In another of its aspects, it relates to a system in which a pig is adapted to sense a condition along a pipeline and to store the sensed information internally of the pig, the arrangement being such that the stored information can be retrieved periodically at convenient times from a point remote from the pig.

In the laying of an offshore pipeline, a large barge is employed and the end of the pipeline to which joints are to be added is supported on the barge with the remainder of the pipeline extending over the end of the barge and gently curving downwardly until it is supported by the ocean floor. As construction proceeds, added joints are welded to the end of the pipeline, the barge moved forward accordingly with the corresponding additional length of the pipeline coming to rest on the ocean floor. In this manner, there is a stepwise addition to the length of the pipeline but there is substantially constant length of pipeline extending between one end of the barge and the ocean floor. The barge is so constructed as to maintain tension on the pipeline extending between the barge and the floor so that it retains a gentle curve which is not sharp enough to cause bending of the pipeline as it is being lowered to the ocean floor. However, the pipeline does at time undergo excessive bending stresses with resulting kinks, dents or other disconformities being formed in it. In order to detect such dents, one practice has been to have divers walk the line as it is laid. Another procedure has been to run a gauging pig after the line is completed. However, both of these practices have obvious disadvantages and it would be highly desirable to avoid the use of divers and yet detect any dents which may be formed in the pipeline at a short distance behind the barge, such as where the pipeline finally engages the ocean floor. This would facilitate repair or replacement of the dented section and would also afford a reasonably accurate determination of the location of the dent.

It is accordingly an object of this invention to provide a pipeline pig which can be towed behind the barge in a pipeline as it is being laid on the ocean floor and which can readily detect dents in the pipeline and signal the presence of such dents to the barge while the latter is in the immediate vicinity of the section of the pipeline having the dent therein.

Another object is to provide such a pig which will sense the minimum inside diameter of the pipeline as it is laid on the ocean floor and display such information on the deck of a pipe laying barge and will do so with a minimum interruption of the normal pipe laying procedures on the barge.

Another object is to provide such a pig which will collapse to a small size in order to pass major dents without the pig becoming lodged in the pipeline.

Another object is to provide such a pig which has a plurality of prolate spheroid-shaped rollers arranged to obtain full circle coverage of the inner wall of the pipeline and yet which has a minor portion of each roller length in actual contact with the pipeline so as to reduce the frictional resistance encountered in pulling the pig along the pipeline and to reduce the wear on the rollers.

Another object is to provide a system for remotely detecting a condition in the pipeline wherein information concerning such condition is temporarily stored in the pig and then read out at a position remote from the pig while the pig is still in the pipeline.

Other objects, advantages and features of the invention will be apparent to one skilled in the art upon consideration of this specification including the claims and the attached drawings wherein:

FIG. 1 is a schematic representation of a length of pipeline as it is being laid on the ocean floor showing a preferred embodiment of the pig of this invention within the pipeline to detect dents therein;

FIG. 2 is a schematic illustration of a pipe laying barge showing the manner in which pipe is supported by the barge as it is being laid;

FIG. 3 is a horizontal elevation of a preferred embodiment of the pig showing it in position in a section of pipeline;

FIG. 4 is a front view of the pig of FIG. 3 and indicates that the view of FIG. 3 is taken along the line of 3—3 of FIG. 4;

FIG. 5 is a partial view, partially in section, showing the pig passing a dent in the pipeline;

FIG. 6 is a block diagram showing a preferred arrangement for storing and transmitting information from a pig in a pipeline to the pipe laying barge or other remote point;

FIG. 7 is an elevational view, partially in section, showing another form of the pig of this invention;

FIG. 8 is a view similar to FIG. 7 but with parts removed in order to better illustrate arrangement of the pig body;

FIG. 9 is a view taken along the line 9—9 of FIG. 7; and

FIG. 10 is a cross-sectional view taken on a line 10—10 of FIG. 7.

In accordance with this invention, a pipeline pig is provided for detecting dents or other deviations from normal in an inner wall of a pipeline. A central pig body supports a plurality of rollers mounted thereon so that the rollers can move inwardly and outwardly of the pig body in a direction generally radially thereof and so that the rollers are biased outwardly against the inner wall of the pipeline for contacting same as they roll along such wall. The rollers are each of a length so as to extend along a substantial portion of the inner circumference of the pipeline wall and have the shape of a prolate spheroid as their general configuration. A minor portion of the length of the rollers is radially enlarged so that only this minor portion normally contacts the pipe wall and the remaining major portion of the length of the rollers is spaced from but sufficiently close to the inner wall of the pipeline to engage dents or other deviations so as to move the entire roller inwardly thereby permitting sensing such dent or deviation. With rollers of this configuration, the entire inner wall of the pipeline can be inspected with a reasonably small number of rollers, preferably six arranged in groups of three, fore and aft each other. With this construction, only a minor portion of the roller is in rolling engagement with the pipeline in the absence of a dent. Without the minor radially enlarged portion, the entire length of the roller would normally be engaged with the pipeline wall and since the radius of the roller varies along its length in order that the entire outer surface of the roller can be proximate to the pipeline wall, it will be appreciated that the smaller diameter portions of the rollers will tend to, if in contact with the pipeline, revolve a greater number of revolutions per length of pipeline than will be the larger diameter portions. As a result, certain portions of the rollers would have to skid along the pipeline thereby increasing the wear on the rollers and making the pig more difficult to tow along the pipeline. By maintaining the major portion of the rollers spaced from the wall of the pipeline as above indicated, there can be no skidding of this portion along the pipeline and by making the minor portion of the length of the rollers of enlarged diameter but a relative small part of length of the roller, friction and wear will be minimized.

In a preferred embodiment, a plurality of rollers are mounted in fore and aft groups and are so connected to a pig body such that when one or more rollers of a group is collapsed by a dent, for example, such movement is sensed by a sensing device. The arrangement is such that the other group of rollers is not collapsed by the collapse of the first set of rollers but, should the other set of rollers encounter a dent, the inward movement of one or more of them will cause the same sensing device to indicate the presence of a dent without at the same time collapsing the first set of rollers. In another arrangement, when one set of rollers encounters a dent, the inward collapse thereof permits a like inward collapse of the other set of rollers even though the latter has not encountered a dent. With this arrangement, a suitable bumper can be provided at the rear of the pig so that should the pig become stuck, a follow-up pig can be pumped in behind and when it pushes against the bumper, it will cause both sets of rollers to collapse so that the pig can be pushed beyond the obstruction.

Also in accordance with this invention, a system is provided for remotely detecting a condition in the pipeline. Thus a pipeline pig is equipped with a means for detecting the condition as it exists along the pipeline. The output of this detecting means is stored in a memory means carried by the pig body. The pig is connected to a remote location by a suitable transmission means which connects the memory means to a readout means at the remote location, the arrangement being such that the memory means can be interrogated by the readout means as desired to obtain the retrieval of any information stored in the memory means. Preferably, means are also provided for conditioning the memory means to receive another output after information stored in the memory means has been retrieved. In this manner, the pig can be moved along a pipeline while it stores information about a condition and the stored information retrieved at desired intervals without having to provide for a continuous retrieval of such information. This avoids continuous recordation and permits a record to be made only when the condition has deviated a predetermined amount from a norm.

Referring to the drawings, FIG. 2 in a very diagrammatic way shows a pipe laying barge 10 anchored in position by anchors 11. Extending from one end of the barge is a pipeline section 12 which is being lowered to the ocean floor as an extension of the pipeline 13 which has already been laid. As indicated, pipeline section 12 is partially supported by a stinger arrangement 14 and generally has a gentle s-shaped curve. As additional lengths of pipe are welded to the end of the pipeline on barge 10, the latter will be moved forward accordingly to in turn pay out an additional section of pipeline as its rear. It is in the section 12 of the pipeline extending between the ocean floor and the barge that dents and other disconformities can occur due to the pipe laying operation. Therefore, it is proposed in accordance with this invention that a pipeline pig 15 be disposed in the pipeline to be towed there along via a cable 16 connected to the rear of a pipe lineup clamp 17. The line-up clamp has a control rod 18 which is used to manually control the various functions performed by the line-up clamp. With the line-up clamp in a position shown bridging the joint 19 between pipeline section 12 and a new length of pipe 20 which is to be joined thereto, the control rod will extend a short distance from the open end of pipe length 20. In one mode of operation, after the weld of joint 19 has been partially completed, the control rod will be manipulated to cause the line-up clamp to retract its shoes and to move sufficiently into section 12 that the control rod does not extend from the end of pipe length 20. Then when the weld at joint 19 is finished (or at least finished for that particular welding station), a new joint of pipe 21 is placed in alignment with pipe length 20 but spaced therefrom so that an operator can manually manipulate the control rod to cause the pipe line-up clamp (which is self powered) to move forward to bridge the new joint between pipe lengths 20 and 21. In so doing, the control rod will be caused to extend from the end of the new length 21 in the same manner as it is shown as extending from the length of pipe 20. As the line-up clamp so moves forward through joint 18, it causes pig 15 to likewise move forward and inspect the length of pipe through which it then is being moved. As will be explained hereinafter, after the new joint of pipe 21 has been positioned and the line-up clamp moved forward so that the control rod 18 extends beyond the new part joint, the readout means (which can be contained within console 22) is connected to an electrical conductor extending along the control rod through the line-up clamp and thence through the cable 16 to pig 15. A reading can then be taken of the results of the conditions sensed by the pig during its last movement and then the console can be disconnected from the control rod. In this manner, a continuous connection between the console and the pig is eliminated and the connection is made only periodically (once per joint) and at a time so as to not interfere with the normal pipe laying operation in such a way as would lengthen the cycle of such operation.

Referring now to FIGS. 3 and 5, there is illustrated a preferred embodiment of the pig of this invention. The pig has a central body designated by the numeral 23 comprising a tubular portion 23a, spaced apart plates 23b and 23c fixed thereto, brackets 23d and 23e respectively carried by the plates and a nose piece 23f.

A plurality of rollers are provided for contacting and rolling along the inner wall of the pipeline as the pig body is moved therethrough. It is preferred that the rollers be mounted in forward and aft groups so as to obtain full circle coverage of the inner wall of the pipeline and yet permit the rollers in each group to move substantially close to the pig body without interfering with each other as when the pig passes a major dent. Means are provided for mounting the rollers on the pig body for inward and outward movement in a direction generally radially of the pig body and biasing the rollers outwardly from engagement with the inner wall of the pipeline. As illustrated, such means can take the form, for each roller, of an L-shaped lever arm 25 pivoted at 26 to one of the brackets 23d or 23e. The short legs 25a of the lever arms of each group of rollers is pivotally linked to plates 27 and 28 respectively. These plates are slidably mounted on a slide assembly respectively comprising rods 29 and 30, the latter being joined together via an intermediate plate 31. The slide assembly is supported on the pig body by plates 23b and 23c through which the rods slidably extend. Rear spring 32 and forward spring 33 respectively abut plates 23b and 23c at one end and plates 27 and 28 at the other end to resiliently urge the respective groups of rollers outwardly into engagement with the pipeline. With this arrangement, it will be seen that the rear spring 32 will urge plate 27 to slide along rods 29 which causes lever arms 25 to move the rear group of rollers outwardly until they are in engagement with the pipeline wall. Similarly, forward spring 33 urges plate 28 to slide on rods 30 to move the forward group of rollers outwardly. Springs 32 and 33 should be strong enough to not only urge the rollers outwardly but also to assure all of the rollers of each group are in contact with the wall of the pipeline when in the section of the pipeline of normal configuration. In this manner, it is assured that the pig body will be centered in the pipeline.

When one or more rollers of a group encounters a dent in a pipeline, such as is suggested in FIG. 5, it will be moved inwardly thereby. This inward movement causes a respective one of the plates 27 or 28 to move forwardly. Such movement also results in forward movement of the slide assembly. For example, if a rear roller encounters a dent, rear plate 27 will engage a stop pin 34 in rods 29 thereby causing rods 29 to slide forwardly through plate 23b. However, the forward group of rollers is not affected by this movement inasmuch as rods 30 merely slide through plate 28. After the dent has been passed, the rear spring 32 will move plate 27 rearwardly until it reaches its nominal position. The slide assembly is also moved rearwardly by a return spring 36. Similarly, when one or more of the rollers of the forward group encounters a dent, it will move plate 28 forwardly against stop pin 35 to thereby cause forward movement of rods 30. The forward movement of rods 30 results in forward movement of rods 29 but this does not affect the positioning of the rear group of rollers since stop pin 34 merely moves away from plate 27.

Means are provided for indicating when a roller is moved inwardly such as when it encounters a dent. This means is illustrated as including a push rod 37 connected at its outer end to a plate 38 which in turn is attached to rods 29. The other end of the push rod has a lost motion connection with a potentiometer 39. The latter is herein illustrated as being of the linear movement type. The lost motion connection is diagrammatically illustrated as including a slot 40 in the inner end of push rod 37 and a cross pin 41 carried by wiper element 42 of the potentiometer. With this construction, referring to FIG. 5, when a roller encounters a dent, the resulting forward movement of the slide assembly and push rod 37 will cause wiper element 42 to be pushed forwardly to thereby change the apparent resistance of potentiometer 39. However, when the pig has passed the dent and the rollers are in their normal position, the rod 37 will have been moved rearwardly by the slide assembly but the lost motion connection does not result in a like rearward movement of wiper element 42. The return of the wiper element to is normal or zero position is caused by actuating a solenoid 43 as will be explained in greater detail below.

The nose piece 23f of the pig is mechanically connected to cable 16 as indicated in FIG. 3. This cable includes inner electrical conductors which extend from the cable connection to the interior of the pig as indicated at 44. One function of the conductor is to supply power to electric motor 45, one of which is illustrated as being mounted on each of lever arms 25. As indicated in FIG. 3, each of the motors has a sprocket 46 having a chain drive 47 with a shaft 48 on which rollers are mounted. The electrical connection between the cable 16 and the motors 45 is via the conductor 44, junction outlets 48 and conductors 49. The motors 45 are preferably reversible and have an internal clutch which disengages them from the chain drive when power is not being applied to the motors. With this arrangement, the pig can be inserted into the open end of the pipeline and then be powered to drive itself through the pipeline until it reaches the desired position such as shown in FIG. 1. Conversely, it can be removed from the pipeline by reversing the motors and driving the pig forward. The reversible feature is not necessary since the pig can be pulled from the pipeline by cable 16. However, it is a desirable feature since it permits the pig to be traversed back and forth across a dent without manipulating cable 16 in order to verify that a dent is present.

Referring now to the construction of the rollers, the preferred form is shown in FIGS. 3 and 4. Thus, each roller is of a length as to extend along a substantial portion of the inner periphery of the pipeline. Each roller also has the general configuration of a prolate spheroid. The configuration can also be described as that of an arc of revolution with the arc having a radius substantially equal to the inside radius of the pipeline in which the pig is to be used. Each roller also has a radially enlarged portion which is a minor part of its length arranged such that only the radially enlarged portion contacts an inner wall of the pipeline when the latter is of nominal cross-sectional configuration and the remaining portion of the roller is spaced from but sufficiently close to an inner wall of the pipeline to engage dents and other deviations. Thus, more specifically, each roller is illustrated in FIGS. 3 and 4 as including a plurality of axially spaced apart segments with each segment being wheel-like in character. Thus each roller is illustrated as including outer segments 50, a pair of inner segments 51 and a pair of intermediate segments 52. As best illustrated in FIG. 4, the inner segments 51 are radially enlarged so that normally the outer and intermediate segments 50 and 52 do not normally engage the pipeline but are spaced closely enough to the inner wall of the pipeline to encounter dents which are greater than a predetermined magnitude and thereby move their respective roller inwardly to indicate such a dent. With this arrangement, it will be seen that normally only inner rollers 51 will be in contact with the pipe wall and since they are of the same diameter, they will roll smoothly along the wall. By maintaining roller segments 50 and 52 out of contact, there is no tendency for the roller to have portions thereof skidding or sliding along the wall as would be the case if the roller segments 50 and 52 were in continuous contact with the wall.

Referring to FIG. 6, there is shown a preferred form of a circuit arrangement for storing information in a pig and retrieving it at a point remote from the pig while the latter is in the pipeline. Of the components shown, it will be understood that those below dash line 42 are contained within the pig while those above the line can be in console 22 (except, of course, cable 16). In this particular embodiment, the potentiometer 39 is connected to a constant current source 54 via a calibrating potentiometer 55. Potentiometer 39 is actuated to some lesser resistance by an obstruction in the pipeline and remains in that position. As each joint of pipe is added, a multiconductor cable is connected between the console 22 and to the conductors in towing cable 16 at the upper end thereof. Making this connection initiates the "test" sequence. Thus, the constant current flowing through potentiometer 55, tow line resistance 16, and diameter measuring potentiometer 39 produces a voltage proportional to pipe diameter that is applied to digital voltmeters 56 and 60, by way of calibration potentiometer 56a. The reading of digital voltmeter 56 is locked in and gated by gate 57 to the comparators 63 and 64, and to the printer 58.

If the voltage is outside the limits set by the maximum or minimum size switches 67, a respective one of alarms 65 and 66 is sounded.

The AC power oscillator 68 is then momentarily switched on to the tow line and activates the release solenoid 43, which releases potentiometer 39 back to the value it had before the device encountered an obstruction in the pipeline. The output of digital voltmeter 60 is then gated by gate 61 to the size comparator circuit and the printer, just as was digital voltmeter 56. This provides evidence that the potentiometer 39 has been properly reset. As the printer 58 prints each voltage reading, an auxiliary bit of information is printed also: One is the time of day from clock 59 and the other is an event count from events counter 62 that represents the total number of times the "test" procedure has been conducted.

Also, a reverse motor solenoid 69 can be provided to reverse the direction of rotation of motors 45.

Thus, it will be seen that a pig is provided with a memory means for storing an output from a detecting means also carried by the pig. Further, a readout means, here illustrated as the printer 58 and its associated circuitry, is located remotely from the pig and in this case can be on the barge 10. Further, transmission means are provided in the form of cable 16 to connect the memory means to the readout means for periodically reading out the output stored in the memory while the pig is in the pipeline. Further, means are provided for conditioning the memory means to receive another output after one output has been read out and this is illustrated as being in the form of release solenoid 43.

Referring to FIGS. 7 to 10, another embodiment, though less preferred, of the pig of this invention is illustrated. In this embodiment, the slide assembly comprises movable plates 27 and 28 interconnected by rods 70 which slidably extend through support plates 71 fixed to the tubular portion 23a of the pig body. The lever arms 25 in this embodiment are pivotally mounted by brackets 23d' connected directly to the tubular portion 23a of the pig body. Also, there is a single return spring 72 which urges both the forward and rearward set of rollers outwardly into engagement with the pipeline. Also the push rod 37 is connected directly to the forward plate 28 and the potentiometer and release solenoid are disposed within a sealed container 73 with which push rod 37 has a sliding seal engagement.

With this arrangement, it will be seen that when one or more of rollers 24 encounter a dent, it will cause the entire slide assembly to move forward thereby permitting all of the rollers on the pig to move inwardly by a like amount. However, when the roller has passed the dent, spring 72 will move all of the rollers outwardly and center the pig in the pipeline.

This construction, in addition to its relative simplicity, has the added advantage in that a bumper means in the form of a bumper plate 74 can be connected by rod 75 to the slide assembly, e.g. to plate 27. Thus, should the pig become stuck in the pipeline, a second pig equipped with cups can be pumped in behind it until the second pig strikes bumper plate 74. Then upon applying further force to the second pig, such as by pumping additional liquid in behind it, it can cause the bumper plate to move forward thereby collapsing all the rollers to their innermost position and affording the maximum opportunity to dislodge the pig from the pipeline.

Referring particularly to FIGS. 9 and 10, it will be seen that rollers 24 have the same prolate spheroidal shape as those illustrated in FIG. 3. However, in this instance, the rollers have only three segments, outer segments 75 and a radially enlarged center segment 76. As shown in FIG. 9, the center segment is the only segment which normally contacts the pipe but the outer segments 75 are spaced closely enough to the inner wall that they will contact any substantial dents therein.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline pig for detecting deviations of an inner wall of a pipeline from a nominal cross-sectional configuration, comprising, in combination; a central pig body; a plurality of rollers for contacting and rolling along an inner wall of a pipeline as the pig body is moved therethrough; means mounting the rollers on the pig body for inward and outward movement in a direction generally radially of the pig body and biasing the rollers outwardly for engagement with an inner wall of a pipeline; said rollers each being of a length as to extend along a substantial portion of an inner periphery of a pipeline for rolling movement therealong and the rollers having substantially the shape of a prolate spheroid with a minor portion of the length thereof being radially enlarged in a manner such that only said minor portion contacts an inner wall of a pipeline when the latter is of nominal cross-sectional configuration and the remaining major portion of the roller is spaced from but sufficiently close to an inner wall of a pipeline to engage inward deviations of such wall and to be moved inwardly thereby; and means for indicating when a roller is so moved inwardly.

2. The pig of claim 1 wherein each of said rollers comprises a plurality of axially spaced apart segments.

3. The pig of claim 2 wherein the segments are wheel-like in character with at least one of the wheel-like segments being located intermediate the ends of the roller and being the radially enlarged portion of the roller; and drive means carried by the pig for driving said at least one wheel-like segment to propel the pig along a pipeline.

4. The pig of claim 1 wherein said mounting means includes an element carried by the pig body for movement with respect thereto and also includes linkages between said rollers and said element such that inward movement of any roller causes movement of said element, said indicating means being responsive to movement of said element.

5. A pipeline pig for detecting deviations of an inner wall of a pipeline from a nominal cross-sectional configuration, comprising, in combination; a central pig body; a plurality of groups of rollers spaced longitudinally along the length of said pig body, each group of rollers having a plurality of individual rollers therein with the rollers of one group being offset circumferentially from the rollers of another group so that the rollers of the groups together provide substantially full-circle coverage of an inner wall of a pipeline; means mounting the rollers on the pig body for inward and outward movement in a direction generally radially of the pig body and biasing the rollers outwardly for rolling contact with an inner wall of a pipeline, said mounting means including a member for each group of rollers carried by the pig body for movement with respect thereto and also includes linkages between the rollers of each group and said member for such group such that inward movement of any roller of such group causes movement of its respective member; said rollers having the general shape of a prolate spheroid so as to conform generally with the curvature of an inner wall of a pipeline; means for indicating when at least one member has been moved by a roller; and means forming a linkage between said indicating means and said members to actuate said indicating means in response to movement of at least one of said members.

6. The pig of claim 5 wherein said members are rigidly connected to each other so that movement of one member causes movement of the other, and wherein a single resilient means urges the members in a direction to bias the rollers outwardly.

7. The pig of claim 5 wherein bumper means are provided at one end of the pig body for causing inward movement of said rollers responsive to movement of the bumper means with respect to the pig body.

8. The pig of claim 5 wherein the mounting means includes biasing means for each group of rollers acting to bias the rollers of that group outwardly; and wherein the linkage means has a limited sliding engagement with each of said members such that movement of one member causes the linkage means to actuate the indicating means without also moving the other member and vice versa.

9. A system for remotely detecting a condition in a pipeline comprising, in combination; a pipeline pig having means for detecting a condition as it exists along a pipeline; said pig carrying memory means for storing an output from said detecting means said memory means being a potentiometer, means for changing the effective resistance of the potentiometer responsive to a change in the output of said detecting means; a readout means located remotely from the pig for periodically reading the output stored in said memory means while the pig is in a pipeline; and transmission means connecting said memory means to said readout means.

10. A roller adapted for use with a pipeline pig to sense abnormalities in the configuration of the inner circumference of a pipeline comprising a shaft, a plurality of roller segments mounted thereon, the segments as a group having the configuration of a prolate spheroid with at least one segment having a radius such that its periphery extends radially beyond the prolate spheroidal configuration of the other segments.

* * * * *